United States Patent
Anello et al.

[11] 3,758,543
[45] Sept. 11, 1973

[54] NOVEL SULFATES AND METHOD FOR THEIR PREPARATION

[75] Inventors: Louis G. Anello, Basking Ridge; Richard F. Sweeney, Randolph Twp., Morris Cty., both of N.J.

[73] Assignee: Allied Chemical Corporation, New York, N.Y.

[22] Filed: Apr. 25, 1967

[21] Appl. No.: 633,368

[52] U.S. Cl.................. 260/458, 106/2, 162/135, 252/8.6, 252/351, 260/486 H, 260/614 F, 260/615 BF
[51] Int. Cl........................................ C07c 141/02
[58] Field of Search..................... 260/458

[56] References Cited
UNITED STATES PATENTS

| | | | |
|---|---|---|---|
| 3,017,421 | 1/1962 | Cohen............................ | 260/458 X |
| 3,006,973 | 10/1961 | Hauptschein et al........... | 260/458 X |
| 3,052,708 | 9/1962 | Velluz et al..................... | 260/456 |

FOREIGN PATENTS OR APPLICATIONS

| | | | |
|---|---|---|---|
| 1,380,579 | 10/1964 | France............................. | 260/458 |
| 1,438,617 | 4/1966 | France............................. | 260/458 |

OTHER PUBLICATIONS

E. Gilbert, "Sulforation and Related Reactions" pp. 3-3-43, 66, 7-18, 348-350, and 365-367, (N.Y. 1964).
Schick, Nonionic Surfactants, Vol. 1, Marcel Dekker, Inc. N.Y. N.Y. p. 45 (1967) TP 149.52

*Primary Examiner*—Leon Zitver
*Assistant Examiner*—Leo B. DeCrescente
*Attorney*—Ernest A. Polin and Jay P. Friedenson

[57] ABSTRACT

Novel sulfate compounds of the formula:
$R-(C)_m-(D)_n-(CH_2)_v-(OSO_2)_u-O-(CH_2)_v-(D)_n-(C)_m-R$
wherein R is a polyhaloisoalkoxyalkyl group having the formula:

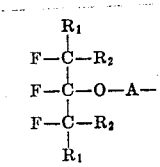

wherein:

a. $R_1$ and $R_2$ are F, Cl, alkyl or haloalkyl groups or, when taken together, are alkylene or haloalkylene groups forming a cycloaliphatic structure, which $R_1$ and $R_2$ groups may each have from 1 to 9 carbon atoms and which halogen atoms, if any, have an atomic weight not exceeding about 79.92, with the proviso that no more than two of the four $R_1$ and $R_2$ groups are alkyl groups and b. A is a member selected from the group consisting of radicals of the formulae:
$-CHR_3-CHR_4-$, $CFR_5-CR_6R_7-$ and

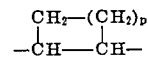

wherein $R_3$ and $R_4$ are independently selected from the group consisting of Cl, H and alkyl; $R_5$ and $R_6$ are independently selected from the group consisting of F and H; $R_7$ is selected from the group consisting of F, H, Cl, Br and perfluoroalkyl; $p$ is an integer of from 1 to 9; with the proviso that when both $R_6$ and $R_7$ are F, $R_5$ is always F, and wherein C is a bifunctional group which may be derived from a telomerizable acetylenically or ethylenically unsaturated compound, $m$ is an integer from 0-75, D is a bifunctional group which may be derived from a telomerizable acetylenically or ethylenically unsaturated compound, $n$ is an integer from 0-75, $u$ is an integer of from 1-6 and $v$ is an integer of from 0-1; with the proviso that each carbon atom which is directly bonded to the $-(OSO_2)_u-O-$ moiety, contains at least one hydrogen atom, are prepared by reacting a polyhaloisoalkoxyalkyl halide corresponding to the general formula:

$R - (C)_m - (D)_n - (CH_2)_v - E$ wherein R, C, D, $m$, $n$ and $v$ are each above defined and where E is a bromine atom or an iodine atom, with sulfur trioxide in at least about the stoichiometric proportions for the reaction.

The novel polysulfate compounds of the invention may be esterified, with an acrylic reagent, to the corresponding polyhaloisoalkoxyalkyl acrylate which in turn may be polymerized to produce useful oil, water and stain repellent agents.

The novel polysulfate compounds of the invention may also be hydrolyzed to the corresponding polyhaloisoalkoxyalkyl alcohols which in turn may be esterified and polymerized to the polyacrylate oil, water and stain repellent agents mentioned above. The alcohols may also be used to prepare useful surfactants.

The novel monosulfate compounds of the invention may be converted to the novel polysulfate compounds of the invention by reaction with $SO_3$.

14 Claims, No Drawings

NOVEL SULFATES AND METHOD FOR THEIR PREPARATION

CROSS-REFERENCES TO RELATED APPLICATIONS

1. Co-pending application of Litt et al., entitled "Fluorinated Ethers," Ser. No. 492,276, filed Oct. 1, 1965 now U.S. Pat. 3,453,333.
2. Co-pending application of Litt et al., entitled "Fluorinated Ethers," Ser. No. 513,574, filed Dec. 13, 1965 now U.S. Pat. 3,470,256.
3. Co-pending application of Anello, Sweeney and Litt, entitled "Telomers and Process for the Preparation Thereof," Ser. No. 633,359, filed Apr. 25, 2967, now U.S. Pat. 3,514,487.

BACKGROUND OF THE INVENTION

This invention is directed to a new class of sulfate compounds and to a novel method for their preparation. More particularly, this invention relates to certain bis(polyhaloisoalkoxyalkyl) sulfate compounds and to a process for their preparation, using a reagent consisting essentially of sulfur trioxide.

The reaction of sulfur trioxide with certain flurorinated alkanes has been reported in the literature to yield the corresponding fluoroalkanoyl halides which upon hydrolysis are converted to the corresponding carboxylic acid anhydride or free acid. There are obtained as by-products from this reaction certain complex sulfur containing fluorinated oxy compounds which by hydrolysis are converted to corresponding fluoroalkanoic acids and anhydrides.

The reaction of 1,1,2,2-tetrahydroperfluoroalkyl iodide with oleum (sulfuric acid containing an excess of sulfur trioxide) has also been reported to yield the corresponding 1,1,2,2-fluoroalkyl hydrogen sulfate. A monosulfate of the formula $(R_fCH_2CH_2O)_2SO_2$ wherein $R_f$ is a perfluoroalkyl group is obtained as a by-product from this reaction.

It has been unexpectedly found that novel bis(polyhaloisoalkoxyalkyl) sulfate compounds may be readily formed by reacting certain polyhaloisoalkoxyalkyl halides with a reagent consisting essentially of sulfur trioxide.

Accordingly, it is a principal object of the present invention to provide novel bis(polyhaloisoalkoxyalkyl) sulfate compounds.

It is a further object of the present invention to provide a novel method for the preparation of certain bis(polyhaloisoalkoxyalkyl) sulfate compounds using a reagent consisting essentially of sulfur trioxide.

It is another object of this invention to provide a novel method for producing useful polyhaloisoalkoxyalkyl alcohols and polyhaloisoalkoxyalkyl acrylates and polyacrylates.

Other objects and advantages will become apparent from the following description.

SUMMARY OF THE INVENTION

Bis(polyhaloisoalkoxyalkyl) sulfate compounds of the present invention conform to the general formula:

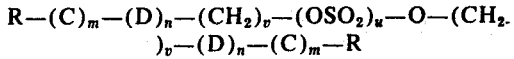

(I)

wherein R is a polyhaloisoalkoxyalkyl group having the formula:

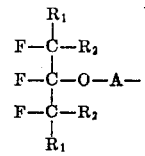

wherein:
a. $R_1$ and $R_2$ are F, Cl, alkyl or haloalkyl groups or, when taken together, are alkylene or haloalkylene groups forming a cycloaliphatic structure, which $R_1$ and $R_2$ groups may each have from one to 9 carbon atoms and which halogen atoms, if any, have an atomic weight not exceeding about 79.92, with the proviso that no more than two of the four $R_1$ and $R_2$ groups are alkyl groups and
b. A is a member selected from the group consisting of radicals of the formulae:

$-CHR_3-CHR_4-$, $CFR_5-CR_6R_7-$ and

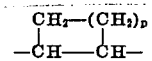

, wherein $R_3$ and $R_4$ are independently selected from the group consisting of Cl, H and alkyl, e.g. alkyl having one to 8 carbon atoms; $R_5$ and $R_6$ are independently selected from the group of F and H; $R_7$ is selected from the group consisting of F, H, Cl, Br and perfluoroalkyl, e.g. trifluoromethyl; p is an integer of from 1 to 9; with the proviso that when both $R_6$ and $R_7$ are F, $R_5$ is always F, and wherein C is a bifunctional group which may be derived from a telomerizable acetylenically or ethylenically unsaturated compound, m is an integer from 0–75, D is a bifunctional group which may be derived from a telomerizable acetylenically or ethylenically unsaturated compound, n is an integer from 0–75, u is an integer of from 1–6 and v is an integer of from 0–1; with the proviso that each carbon atom which is directly bonded to the $-(OSO_2)_u-O-$ moiety, contains at least one hydrogen atom.

The novel bis(polyhaloisoalkoxyalkyl) sulfate compounds of the invention are characterized by the particular configuration of the polyhaloisoalkoxyalkyl portion of the molecule. This portion of the molecule is critically characterized by the presence of a carbon atom linking an oxygen atom and a fluorine atom, in combination with two haloalkyl linkages satisfying the remaining valences of the carbon atom linking the oxygen and fluorine atoms. The haloalkyl linkages are characterized by the presence of at least one fluorine atom on each carbon atom which is adjacent to the carbon atom which links the oxygen and fluorine atoms. The haloalkyl linkages may, when taken together, form a cycloaliphatic structure. The term polyhaloisoalkoxyalkyl herein shall be understood as including such cycloaliphatic structures.

In the above formula $R_1$ and $R_2$ may be the same or different and may be F or saturated straight-chain and branched-chain alkyl, haloalkyl, alkylene or haloalkylene groups of the type indicated.

There is no absolute criticality for the length of carbon chain when the A group contains an alkyl or perfluoroalkyl group. The only real limitation on the length of the carbon chains is solubility of the resulting products in applications for which solubility is necessary or desired. Alkyl or perfluoroalkyl groups containing 1–6 carbon atoms are preferred. These groups may be straight-chain or branched-chain.

As used in the present specification the prefix "perhalo" means that the compound or group so described contains solely carbon and halogen and the prefix "perfluoro" means that the compound or group so described contains solely carbon and fluorine.

With reference to formula I, the C and D groups are not absolutely critical. They may be derived from any telomerizable unsaturated material. The prior art discloses a vast number of such telomerizable materials. Exemplary listings may be found in U.S. Pat. No. 3,083,238 and U.S Pat. No. 3,145,222, the disclosures of which in this regard are hereby incorporated by reference. Such materials may be acetylenically or olefinically unsaturated. Moredetails of such materials and the nature of the groups derived therefrom are disclosed in co-pending application of Anello, Sweeney and Litt mentioned supra.

It has been found that the novel sulfate compounds of the invention can be converted to polyacrylates having unusual activity as oil, stain and water repellent agents. For the purposes of this discussion, the term polyacrylate refers to methacrylate polymers as well as to acrylate polymers.

Those sulfates possessing high fluorine contents, particularly those in which $R_1$ and $R_2$ are F or perfluoroalkyl groups and in which the A, C and D moieties contain a high proportion of fluorine atoms, are particularly useful in preparing polyacrylates capable of imparting high oil, stain and water repellency to treated substrates.

The novel sulfates of the invention may be prepared by reacting a polyhaloisoalkoxyalkyl halide of the formula:

$$R - (C)_m - (D)_n - (CH_2)_v - E$$

(II)

wherein R, C, D, m, n and v are each above defined and wherein E is a bromine atom or an iodine atom, with a reagent consisting essentially of sulfur trioxide.

The polyhaloisoalkoxyalkyl halide reactant, obtained by methods hereinbelow described, may comprise a single compound conforming to above formula (II) or a reaction mass composed of a variety of polyhaloisoalkoxyalkyl halides as described.

The polyhaloisoalkoxyalkyl halides having a single methylene group interposed between the polyhaloisoalkoxyalkyl group and the E atom, i.e., the 1,1-dihydropolyhaloisoalkoxyalkyl halides wherein v is one and m and n are both 0, may be prepared from the corresponding polyhaloisoalkoxyalkyl alcohols having the formula:

$$R - CH_2OH$$

wherein R has the afore-stated meaning, for forming the corresponding p-toluene sulfonyl esters thereof and heating the same at an elevated temperature in the presence of an alkali metal iodide or bromide, such as sodium iodide, as is more fully disclosed by Tiers, et al. in *Journal of the American Chemical Society*, Vol. 75, pp 5978-9 (1953).

1,1-Dihydropolyhaloisoalkoxyalkyl alcohols, $R—CH_2OH$, may be prepared from the corresponding lower alkyl carboxylic acid esters by reaction thereof with a reducing agent such as lithium aluminum hydride. The lower alkyl esters are prepared from the free carboxylic acids $R—COOH$, wherein R has the afore-stated meaning, by esterification thereof with a lower alkanol such as methanol. These polyhaloisoalkoxyalkyl carboxylic acids may be obtained by oxidation, for example, potassium permanganate oxidation, of the corresponding terminally unsaturated polyhaloisoalkoxyalkyl olefins having the formula $R—CH=CH_2$. These polyhaloisoalkoxyalkyl olefins are obtained by dehydroiodination of the corresponding 1,1,2,2-tetrahydropolyhaloisoalkoxyalkyl iodides or bromides having the formula $R—CH_2Ch_2E$ wherein R and E have the afore-stated meanings using a dilute base such as potassium hydroxide in an alcoholic solution. This sequence of reactions to preparation of 1,1-dihydropolyhaloisoalkoxyalkyl alcohols is illustrated by the following equations in which 1,1,2,2-tetrahydroperfluoroisopropoxybutyl iodide serves as starting material:

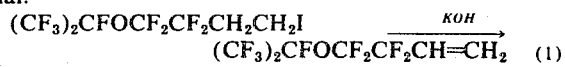

$(CF_3)_2CFOCF_2CF_2CH_2CH_2I \xrightarrow{KOH}$
$\qquad (CF_3)_2CFOCF_2CF_2CH=CH_2$ (1)

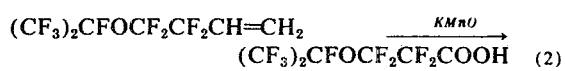

$(CF_3)_2CFOCF_2CF_2CH=CH_2 \xrightarrow{KMnO}$
$\qquad (CF_3)_2CFOCF_2CF_2COOH$ (2)

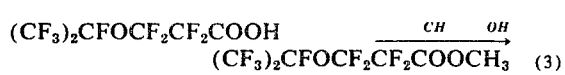

$(CF_3)_2CFOCF_2CF_2COOH \xrightarrow{CH\ OH}$
$\qquad (CF_3)_2CFOCF_2CF_2COOCH_3$ (3)

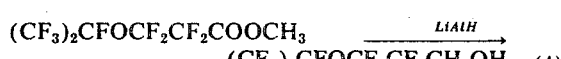

$(CF_3)_2CFOCF_2CF_2COOCH_3 \xrightarrow{LiAlH}$
$\qquad (CF_3)_2CFOCF_2CF_2CH_2OH$ (4)

1,1-Dihydropolyhaloisoalkoxyalkyl alcohols of the type:

$$(R_f)_2CFOCF_2CH_2CH_2OH$$

for example, wherein $R_f$ is a perfluoroalkyl group, may be prepared by the following sequence of reactions:

$(R_f)_2CFOCF_2CH_2I \xrightarrow{CH\ =CH}$
$\qquad (R_f)_2CFOCF_2CH_2CH_2CH_2I$ (5)

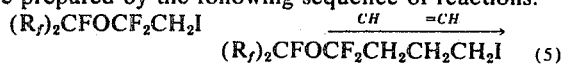

$(R_f)_2CFOCF_2CH_2CH_2CH_2I \xrightarrow{oleum}$
$\qquad (R_f)_2CFOCF_2CH_2CH_2CH_2OH$ (6)

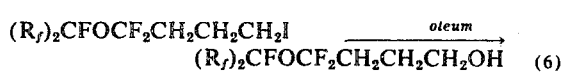

$(R_f)_2CFOCF_2CH_2CH_2CH_2OH \xrightarrow{P\ O\ (-H\ O)}$
$\qquad (R_f)_2CFOCF_2CH_2CH=CH_2$ (7)

Product (7) may then be oxidized, esterified and reduced, as shown in reaction sequences (2)–(4) above, to the desired alcohols.

The polyhaloisoalkoxyalkyl halides wherein v is 1 and m or n or both are 1 or more, may be prepared from the corresponding alcohol of the formula $R(C)_m—(D)_n—CH_2OH$, wherein R, C and D are as defined above and m and n or both are 1 or more, by the method employed in forming the polyhaloisoalkoxyalkyl halides wherein v is 1 and both m and n are 0, as described above.

Alcohols of the formula $R(C)_m—(D)_n—CH_2OH$ wherein m and n or both are 1 or more, may be prepared from an appropriate polyhaloisoalkoxyalkyl iodide having the formula $R(C)_m—(D)_n—I$, wherein R, C, D, m and n have appropriately corresponding meanings by reaction thereof with an unsaturated alcohol of the formula $CH_2=CH(CH_2)_xOH$, in the presence of a free radical catalyst such as benzoyl peroxide, whereby an intermediate of the formula $R(C)_m—(D)_n—CH_2CHI(CH_2)_xOH$ is formed and subsequently reducing said intermediate with zinc as is more fully described in U.S. Pat. No. 3,145,222.

Polyhaloisoalkoxyalkyl halides, $R(C)_m—(D)_n—(CH_2)_v—E$, wherein $v$ is 0, which serve as reactants in the above processes or which may themselves be used as reactants with sulfur trioxide in order to produce novel sulfates according to the invention may be prepared by telomerization or addition, under free radical conditions, of polyhaloisoalkoxyalkyl halide telogen having the formula:

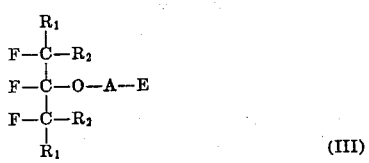

(III)

wherein $R_1$, $R_2$, A and E are as previously defined, with the additional proviso that when E is bromine there may not be any other bromine substitution in the molecule; with a telomerizable acetylenically or ethylenically unsaturated compound.

The telogen starting materials may be prepared by reaction of an appropriate halogenated ketone with an ionizable fluoride salt to form a fluorinated organic salt and then reacting the organic salt with a halogen other than fluorine (e.g., iodine, bromine) and an appropriate olefin to form the desired polyhaloisoalkoxyalkyl halide. The reactions are more fully described in co-pending applications of Litt et al., Ser. No. 492,276, filed Oct. 1, 1965 and Litt et al., Ser. No. 513,574, filed Dec. 13, 1965, the pertinent subject matter of which is hereby incorporated by reference. For example, as is described in Examples 1 and 3 of the former application, the telogen perfluoroisopropoxyethyl iodide, $(CF_3)_2CFOCF_2CF_2I$, may be prepared by reacting hexafluoroacetone with potassium fluoride in acetonitrile solvent to produce the corresponding addition compound having the formula $(CF_3)_2CFO-K^+$ and thereafter reacting this addition compound with tetrafluoroethylene and iodine in the presence of an inert organic solvent to form the desired perfluoroisopropoxyethyl iodide, $(CF_3)_2CFOCF_2CF_2I$.

As noted above, the telomerizable acetylenically ethylenically unsaturated reactant is not absolutely critical. The only limitations thereon are (1) if E is a bromine atom, there may not be any other bromine substitution in the molecule and (2) the unsaturated reactant must be chosen so that the telomer product which is reacted with sulfur trioxide, contains at least one hydrogen atom on the carbon atom adjacent to the E atom.

If telomers corresponding to the formula $R(C)_m—(D)_n—E$ are to be employed as starting materials for reaction with sulfur trioxide according to the invention, i.e. compounds according to formula (II) wherein $v$ is 0 and either $m$ or $n$ has the value one or more, such may be obtained by telomerizing a telogen of formula (III) with a telomerizable unsaturated compound as described herein. Subject to the conditions described herein, the telomerizable unsaturated compound may be the same or different from that used as reactant with the fluorinated organic salt and halogen in preparation of the telogen starting materials. Then both $m$ and $n$ are 1 or over, the products thereby defined are obtained by reacting a suitable telogen with a first telomerizable unsaturated material to form a telomer and reacting the telomer thus produced with a second telomerizable unsaturated material. Subject to the conditions described herein, the second telomerizable material may be the same or different as the first telomerizable unsaturated material.

As can be seen from the above description, the telomers produced can serve as telogens for further reactions. The term telogen will be used in this sense herein. In other words, the telogen may be a telomer product produced from a telogen, which telomer produced is further telomerizable.

The reaction between the telogen and the telomerisable unsaturated compound is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100°C. and 350°C., preferably between about 150–200°C. Furthermore, although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200°C., the reaction is substantially complete in about 3 hours. On the other hand, if portionwise or continuous addition of tetrafluoroethylene is used, for example, the reaction time is dependent on temperature and the rate of unsaturated compound addition. Normally, the reaction time may range from about 10 minutes to about 2 weeks, usually from about 1 hour, to about 48 hours.

The telomerization reaction may also be conducted by the use of a catalyst or light of sufficient intensity to initiate the free radical reaction. Illustrative free radical generating catalysts include azonitriles such as alpha, alpha'-azobisisobutyronitrile and organic peroxides such as benzoyl peroxide, acetyl peroxide and pelargonyl peroxide. The telomerization reaction is more fully described in co-pending application of Litt, Sweeney and Anello mentioned supra, the pertinent details of which are hereby incorporated by reference.

The sulfur trioxide which is reacted with the polyhaloisoalkoxyalkyl halide, above described in accordance with the invention, may be in liquid, gaseous or solid form. It is generally preferred, however, to employ the liquid form, particularly in its stabilized form, i.e., liquid sulfur trioxide containing an additive which inhibits spontaneous isomerization thereof into a form of sulfur trioxide which is solid at room temperature. Technical grade, stabilized, liquid sulfur trioxide, commercially available under the trade name of Sulfan, is particularly suited for use in the process of the present invention.

In producing the bis(polyhaloisoalkoxyalkyl) sulfate compounds of the present invention it is essential that at least a stoichiometric amount of sulfur trioxide required for reaction with the polyhaloisoalkoxyalkyl halide reactant be employed. It should be appreciated that the amount of sulfur trioxide required will depend upon the sulfate product desired. When a bis(polyhaloisoalkoxyalkyl) monosulfate is the desired product, the above described halide reactant must be contacted with at least about an equimolar amount of sulfur trioxide. The reaction which takes place may be illustrated by the equation:

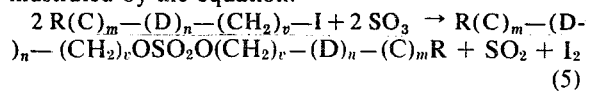
(5)

However, when a bis(polyhaloisoalkoxyalkyl) polysulfate compound, i.e., a sulfate compound conforming to structural formula (I) wherein $u$ is at least 2 is the desired product, at least 1 moles of sulfur trioxide per mole of halide reactant must be employed. For example, when a pyrosulfate is the desired product, i.e., a polysulfate compound conforming to formula (I) wherein $u$ is 2, the reaction which takes place may be illustrated by the following equation:

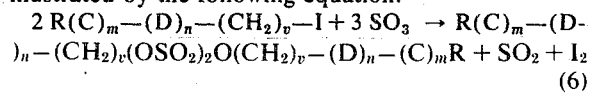
(6)

It is evident from the above equation that for each mole of desired polysulfate product produced, 2 moles of the polyhaloisoalkoxyalkyl iodide starting material must be reacted with at least three moles of sulfur trioxide. Accordingly, for each additional sulfate ($OSO_2$) unit desired in the polysulfate product, at least one additional mole of sulfur trioxide must be charged for reaction with the iodide starting material. In general, however, it is preferred to charge an amount of sulfur trioxide in excess of the stoichiometric amount required for reaction with the iodide reactant, for example, about 2 to 10 moles of sulfur trioxide per mole of iodide reactant. Although higher proportions of the sulfur trioxide reactant may be employed, no additional advantages are realized thereby.

The reaction temperature is not critical and may vary from about 0° to 200°C. at atmospheric pressure. The reaction is exothermic and cooling of the reaction vessel contents by any conventional manner is normally required. Accordingly, lower temperatures, for example in the range of about 15° to 70°C., are preferred in order to avoid undesirable side reactions. If desired, particularly at the higher temperatures, the reaction may be carried out at superatmospheric pressures in the range of about 1 to 300 atmospheres, although pressures in the range of about 1 to 20 atmospheres are preferred when superatmospheric pressures are employed. Subatmospheric pressures are also operable. Generally, the autogenous pressure of the reactants at the above temperatures are advantageously employed. For best results, it is preferred to operate at such temperatures and pressures that at least a portion of the halide reactant is maintained in the liquid phase.

The time required for the reaction is dependent upon such factors as the reactivity of the reactants employed, reaction temperatures, reaction pressures, etc. and may vary from about 10 minutes to 100 hours, although reaction times of 30 minutes to 15 hours are generally preferred.

If desired, the reaction may be conducted in the presence of a solvent. The solvent employable herein should be capable of solubilizing the reactants and must be inert to the reactants and products of the reaction. Suitable solvents include halogenated hydrocarbons such as hexachloroethane and 1,1,1,3,4,-4,4-hexafluoro-2,2,3-trichlorobutane, sulfur dioxide, and the like.

The reaction product, obtained as a result of the reaction of the polyhaloisoalkoxyalkyl halide, above described, with sulfur trioxide, normally comprises a mixture of polyslufate compounds conforming to the above stated structural formula (I) and is dependent upon the reactant proportions, reaction time, reaction temperature and other reaction variables. If desired individual compounds may be separated therefrom by conventional physical separatory procedures, e.g. by fractional distillation; fractional crystallization using an inert solvent such as carbon tetrachloride or acetonitrile; and paper chromatography. It is intended that the appended claims cover both individual bis(polyhaloisoalkoxyalkyl) sulfate compounds and mixtures of bis(polyhaloisoalkoxyalkyl) sulfate compounds.

The bis(polyhaloisoalkoxyalkyl) sulfate compounds produced in accordance with the present invention are valuable and versatile as chemical intermediates.

The bis(polyhaloisoalkoxyalkyl) sulfate compounds of the present invention which contain more than one sulfate ($OSO_2$) unit may be directly converted to the corresponding polyhaloisoalkoxyalkyl acrylate or methacrylate esters having the formula $R(C)_m—(D)_n—(CH_2)_vOCOC(Q)=CH_2$ wherein R, C, D, m, $n$ and $v$ have the afore-stated meanings and wherein Q is hydrogen or methyl, by contacting the polysulfate with acrylic or methacrylic acid or the corresponding anhydrides, at an elevated temperature. The acid reagents are preferred. The preferred polysulfate compounds for this reaction are those possessing 2-3 sulfate groups.

The reaction will proceed at temperatures between about 25-150°C. Preferably, temperatures between about 80-120°C. should be employed and still preferably between about 90-110°C.

At least stoichiometric proportions of the acrylic reagent and the polysulfate should be employed but preferably an excess of the acrylic reagent is employed. Generally, the more sulfate groups in the molecule, the greater should be the excess of acrylic reagent employed. Usually, from 1-2 moles of acrylic reagent per mole of polysulfate starting material should be employed. Larger excesses of acrylic reagent may be employed, however, without adversely affecting the reaction.

Recovery of the acrylic product may be accomplished by simple and conventional procedures. Upon cooling the reaction mixture to room temperature, two phases are formed. The desired acrylic product is in the lower phase. The lower phase may be separated by mechanical means and distilled to recover purified product or the upper phase, which is water soluble, may be washed out with water, following which the water-insoluble lower phase may be dried and distilled.

The resultant acrylate or methacrylate monomers may be homopolymerized by conventional techniques, for example, by bulk polymerization, solution polymerization and emulsion polymerization using a free radical polymerization initiator. These polymers from extremely adherent coatings on various surfaces including cloths, fibers, papers, cellulosic materials and metals which provide good resistance to oils, fuels, lubricants, hydraulic fluids, common organic solvents and water.

The bis(polyhaloisoalkoxyalkyl) sulfate compounds of the present invention which contain more than one sulfate ($OSO_2$) unit may also be hydrolyzed to the corresponding polyhaloisoalkoxyalkyl alcohols having the formula $R(C)_m-(D)_n13 (CH_2)_vOH$, wherein R, C, D, m, n and v have the afore-stated meanings, by reaction with dilute mineral acid. The preferred polysulfate compounds for this reaction are those possessing 2–3 sulfate groups.

The hydrolysis reaction will proceed at temperatures between about 25–150°C. Generally, temperatures between about 90–110°C. are preferred for this reaction. The preferred mineral acid is $H_2SO_4$, although other mineral acids, such as $H_3PO_4$ and HCl can be used to advantage.

It has been found that with $H_2SO_4$, concentrations of about 25–75% produce good results with concentrations in the range of about 35–50% being preferred.

With respect to use of $H_2SO_4$, it has been found that weight ratios of about 1–2:1 $H_2SO_4$ to polysulfate reactant should be used to optimize results.

Recovery procedures or the alcohol products are analogous to those useful in recovering the acrylic products produced from the polysulfates as described above. Two phases are formed in the reaction mixture. The lower phase comprises the desired alcohol product and may be readily separated and distilled.

The alcohols formed from the bis(polyhaloisoalkoxyalkyl) sulfate compounds of the present invention serve as intermediates in the preparation of various useful materials including acrylic and methacrylic polymers, above described, fire extinguishing chemicals, surfactants and paper sizes, as is more fully described in copending application of Litt, Sweeney and Anello mentioned supra. The alcohols may be converted to corresponding acrylates or methacrylates by conventional procedures such as Fischer esterification, in which the alcohol is reacted with an acrylic reactant in the presence of $H_2SO_4$ as catalyst, a solvent such as benzene and a polymerization inhibitor such as hydroquinone or by transesterification with an acrylic ester in the presence of $H_2SO_4$ as catalyst and a polymerization inhibitor.

The acrylic or methacrylic products thus produced may be polymerized to the corresponding polyacrylates possessing valuable oil, water and stain repellent properties, by the usual procedures such as described above.

The bis(polyhaloisoalkoxyalkyl) monosulfate compounds of the invention can be converted to the corresponding polysulfate compounds by reaction with $SO_3$. Reaction conditions for such conversions are generally as described above for preparation of the monosulfate or polysulfate compounds from the polyhaloisoalkoxyalkyl halide reactants.

The novel bis(polyhaloisoalkoxyalkyl) monosulfates can not be directly converted to the corresponding acrylates or alcohols in the facile manner in which the novel bis(polyhaloisoalkoxyalkyl) polysulfates react to form such derivatives. The monosulfates can be directly hydrolyzed to the corresponding alcohols but require the use of highly corrosive concentrated mineral acids or the use of alkaline conditions to carry out the hydrolysis.

DESCRIPTION OF THE PREFERRED EMBODIMENTS

With reference to the R group in formula (I) for the novel sulfate products of the invention, $R_1$ and $R_2$ are preferably F or perfluoroalkyl groups. If perfluoroalkyl groups, $R_1$ $R_2$ preferably contain 1–2 carbon atoms. When the $R_1$ and $R_2$ groups contain halogen substitution, other than fluorine, or hydrogen substitution, it is preferred that enough fluorine substition be provided so that the atomic ratio of fluorine to the other halogen atoms, to the hydrogen atoms or to be combined total of the other halogen atoms and hydrogen atoms, is at least 1:1.

The A moiety of the R group of the novel sulfate products of formula (I) is preferably either a $-CH_2CH_2-$ group or a $-CF_2CF_2-$ group.

In other preferred embodiments, v is 1, n is 0, m is 1 and C is derived from ethylene or tetrafluoroethylene.

With respect to the C and D groups which may be derived from telomerizable unsaturated materials, ethylenically unsaturated materials are preferred. The following formula represents a preferred class of such ethylenically unsaturated materials:

$$Z_1Z_2C = CZ_3Z_4$$

(III)

wherein:
a. $Z_1$, $Z_2$, $Z_3$ and $Z_4$ may each be selected from the group consisting of H, F, Cl and Br provided that $Z_1–Z_4$ do not include more than two chlorine atoms and one bromine,
b. when at least two members of the group $Z_1$, $Z_2$, $Z_3$ and $Z_4$ are H or F, the remaining two members may each be a perhalomethyl group having the formula $-C(X_a)_3$, wherein $X_a$ is a halagen atom having an atomic weight not exceeding about 79.91,
c. when $Z_1$ and $Z_3$ are each H or F, each of $Z_2$ and $Z_4$ may additionally be selected from the group consisting of $-CF_2X_b$, $-Y_1-CH=CH_2$, $-Y_1-OY_2$, $-Y_1-CO_2Y_2$, $-Y_1-CON-(Y_2)_2$, $-Y_1-CONY_2-CH_2NY_2-CO-Y_2$, $-CH=CH_2$,

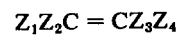

$-Y_1-CH-CO_2Y_4$,
$-Y_1-Y_3$, $-Y_1-O_2CY_2$, $-Y_1-OY_1-CO_2Y_2$, $CO_2Y_4$, $-Y_1-CH(CO_2Y_4)_2$, $-Y_1-CO-Y_1-CO_2Y_2$, $-OOCY_4$, $-O-Y_4$ and $-O-Y_5$, wherein $X_b$ is an alkyl radical having from 1–8 carbon atoms, or a haloalkyl radical having from 1–8 carbon atoms in which haloalkyl radical the halogen atoms have an atomic weight not exceeding about 79.91, or an alkenyl, aryl, alkyl-substituted aryl, or halo-substituted aryl radical, and wherein $Y_1$ is saturated divalent alkylene bridging group or a saturated divalent halogen containing bridging group in which the halogen atoms have atomic weights not exceeding about 79.91; $Y_2$ is a member selected from the group consisting of H and alkyl; $Y_3$ is aryl, $Y_4$ is alkyl and $Y_5$ is alkenyl, perfluoroakenyl, perfluorochloroalkenyl, perfluorobromoalkenyl or perfluorohydroalkenyl group having from one to 8 carbon atoms,
d. when $Z_1$, $Z_2$, and $Z_3$ are each H or F, $X_b$ may additionally be a perfluoroalkenyl, perfluorochloroalkenyl, perfluorobromoalkenyl or perfluorohydroalkenyl group having from one to 8 carbon atoms, and
e. $Z_3$ or $Z_4$ or $Z_1$ and $Z_3$ may be joined together to form a cycloaliphatic ring system.

When $X_b$ in the above formula is an alkyl, haloalkyl, alkenyl or alkyl-substituted aryl radical, these may be straight-chain or branched-chain groups, preferably containing up to 12 carbon atoms. When $X_b$ is an aryl or otherwise substituted aryl radical, aryl groups such as phenyl or naphthyl and substituted derivatives thereof, including ortho-, meta- or para-substituted derivatives thereof are contemplated such as ortho- meta- or para-tolyl; ortho-, meta- or para-chlorophenyl.

Illustrative telomerizable compounds include the following: $CF_2=CF_2$, $CF_2=CH_2$, $CCl_2=CH_2$, $CFH=CH_2$, $CClH=CH_2$, $CH_2=CH_2$, $CFH=CF_2$, $CFH=CFH$, $CClH=CClH$, $CF_2=CFCl$, $CF_2=CFBr$, $CF_3CF=CF_2$, $CFhd 2ClCF=CF_2$, $CF_3CH=CF_2$, $CF_3CCl=CF_2$, $(CF_3)_2C=CF_2$, $CF_3CF=CFCl$, $CF_3CH=CFCl$, $CFCl=CFCl$, $CF_3CF=CH_2$, $CF_2ClCF=CF_2$, $CF_2BrCF=CF_2$, $CF_3CF=CFCF_3$, $CF_2=CFCF=CF_2$, $CFCl=CFCF=CF_2$, $CF_2=CClCF=CF_2$, $CFCl=CFCF=CFCl$, $CF_2=CClCCl=CF_2$, $CF_2=CFCH=CF_2$, $CHF=CFCF=CF_2$, $CF_2=CHCH=CF_2$, $CHF=CHCFCl_2$, $CHF=CFCF_3$, $CF_2=CF(CH_2)_6CH_3$, $CF_2=CFCHClCH_3$, $CF_3=CF(C_6H_4Cl)$, $CF_2=CF(C_6H_4(CH_3))$, $CF_2=CF(C_6H_4(CH_2Cl))$, $CF_2=CHCF_2CH_3$, $CF_2=CHCF_2CH_2Cl$, $CF_2=CHCF_2(C_6H_5)$, $CF_2=CHCF_2(C_6H_4Cl)$, $CF_2=CHCF_2(C_6H_4(CH_3))$, $CF_2=CHCF_2(C_6H_4(CH_2Cl))$, $CH_2=CCF_3CF_2Br$, $CF_2=C(CF_3)CF_2(C_3H_7)$, $CHCL=CFCF_3$, $CH_2=CClCF_2CH_3$, $CF_2=C=CF_2$, $$\begin{array}{cccccc} CF=CF & CFCl-CF & CF_2-CCl & CFCl-CF & CF=CF & CHF-CF \\ | \quad | & | \quad | & | \quad | & | \quad | & | \quad | & | \quad | \\ CF_2-CFBr, & CF_2-CF, & CF_2-CF, & CFCl-CF, & CF_2-CF_2, & CHF-CF, \end{array}$$

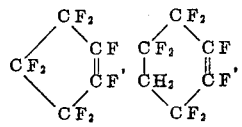

$CH_2=CHO_2CCH_3$, $CH_2=CHCH_2O_2CCH_3$,
$CH_2=CH(CH(CH_2)_9O_2CC_2H_5$,
$CH_2=CH(CH_2)_2-O(CH_2)_2OO_2H$,
$CH_2=CH(CH_2)_3CO_2H$, $CH_2=CH(CH_2)_3CO_2C_2H_5$,
$CH_2=CHCH_2CH-(CO_2CH_3)_2$, $CH_2=C(C_2H_5)_2$,
$CH_2=CH(CH_2)_8CO(CH_2)_5CO_2H$, $(CH_2=CH(CH_2)_2-CONH)_2CH_2$, $CH_2=CHCO_2C_2H_5$, $CH_2=CH-C_6H_5$,
$CH_2=CHCH_2CH(OC_2H_5)_2$, $(CH_2=CHCH_2)_2O$,
$CH_2=CHCH_2O(CH_2)_2OH$,

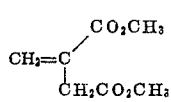

$C_2H_2$, $C_4H_9C$ CH and HC $CC_6H_5$. A portion of this listing has been taken from the exemplary telomerizable unsaturated compounds listed in U.S. Pat. No. 3,145,222. Many more suitable telomerizable unsaturated compounds will readily occur to one of ordinary skill in the art.

The preferred telomerizable unsaturated compounds are tetrafluoroethylene, vinylidene fluoride, chlorotrifluoroethylene perfluoropropylene and ethylene.

With reference to formula (I), preferred values of m and n are 1–40 and still preferably 1–7.

A particularly useful embodiment of polysulfates for use in preparing polyacrylate oil and stain repellent agents are those in which the C group, as noted in formula (I) is derived from tetrafluoroethylene and the D group is derived from ethylene. When D is derived from ethylene, the preferred value for n is one.

Specific examples of the groups designated as R in formula (I) include the following:

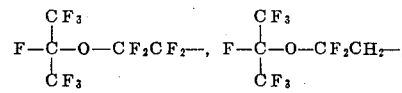

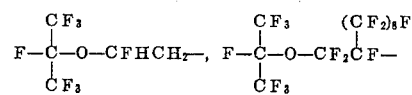

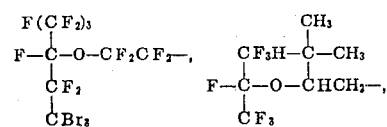

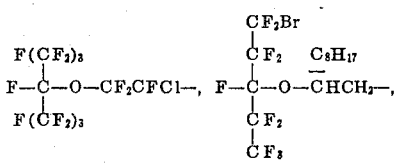

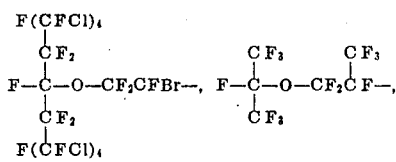

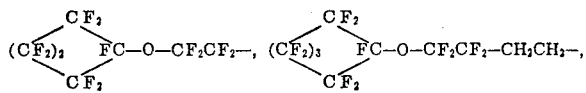

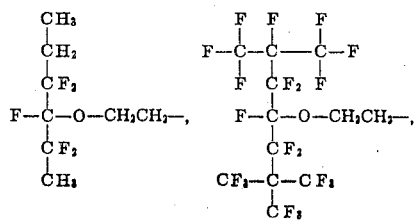

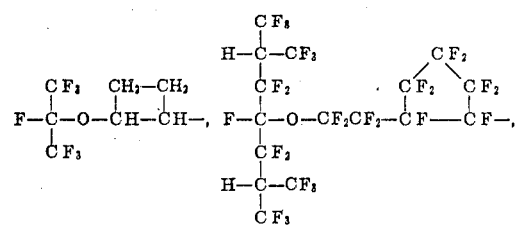

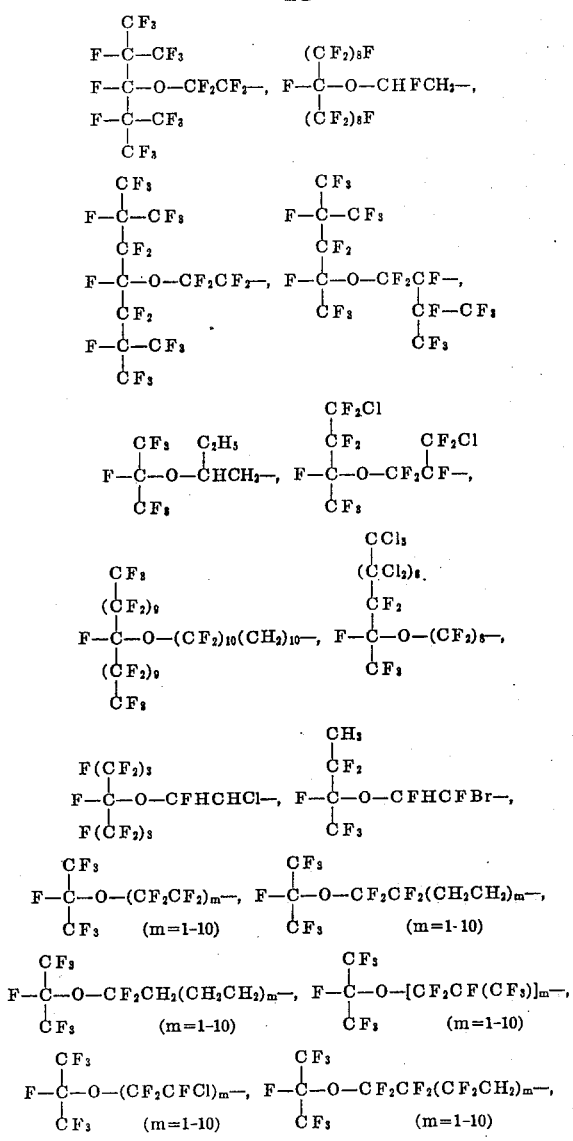

It must be remembered that a requirement for the novel bis(polyhaloisoalkoxyalkyl) sulfate compounds of the invention is that each carbon atom which is directly bonded to the $-(OSO_2)_u-O-$ moiety contains at least one hydrogen atom. With reference to formula (I) and description above it can be seen that the carbon atoms in question can be donated from any of the A, C, D, or $(CH_2)_v$ groups. Since, with the exception of the A group, any of C, D and the $(CH_2)_v$ groups may be cancelled from the formula when the appropriate modifying value is 0, choice of reactants, in preparing the novel sulfates herein should be controlled so that the subject condition of presence of at least one hydrogen atom on the indicated carbon atoms, is satisfied.

The following examples relate to the preparation of representative sulfates of the present invention but are not intended to be limiting on the scope thereof.

EXAMPLE 1

Preparation of Bis(1,1,2,2-Tetrahydro-3,3,4,4-Tetrafluoro-4-Heptafluoroisopropoxybutyl) Monosulfate A 500 ml. three-neck flask, connected to a Dry Ice-acetone cooled trap was charged with 92 grams (0.21 mole) of 1-iodo-1,1,2,2-tetrahydro-3,3,4,4tetrafluoro-4-heptafluoroisopropoxy-butane, $(CF_3)_2CFOCF_2CF_2CH_2CH_2I$, (boiling point 85–87°C./100 mm.). With stirring, 72 grams (0.90 mole) of stabilized sulfur trioxide (commercially available under the trade name, Sulfan) was added slowly to the flask. The reaction was quite exothermic and ice-water cooling was necessary to maintain the reaction temperature between 30°–35°C. After the sulfur trioxide addition was completed, the reaction mixture was heated to 75–80°C. for 6 hours during which two liquid phases were formed. The liquid reaction mixture was cooled to room temperature and the gaseous constituents vented to a Dry Ice-acetone trap. The trap material (about 14 grams) was identified as sulfur dioxide. After the two liquid phases were separated, the upper phase, a light colored oil, was distilled by use of a spinning band distillation column. There were recovered 26 grams (0.32 mole) of unreacted sulfur trioxide and 76 grams (0.15 mole, 71% yield) of a water-white oil having the formula $[(CF_3)_2CFOCF_2CF_2CH_2CH_2O]_2SO_2$ (boiling point - 105–110°C./1 mm.). Analysis: Calculated for $C_{14}F_{22}H_8SO_6$: C, 23.27; F, 57.89; S, 4.43; H, 1.11. Found: C, 23.6; F, 57.2; S, 4.27; H, 1.29.

EXAMPLE 2

Attempted Esterification of Bis(1,1,2,2-Tetrahydro-3,3,4,4-Tetra-fluoro-4-Heptafluoroisopropoxybutyl) Monosulfate with Acrylic Acid Into a 100 ml. three-neck flask were placed 42 grams (0.058 mole) of bis(1,1,2,2-tetrahydro-3,3,4,4-tetrafluoro-4-heptafluoroisopropoxybutyl) monosulfate having the formula $[(CF_3)_2CFOCF_2CF_2CH_2CH_2O]_2SO_2$ and 11 grams (0.15 mole) of acrylic acid. About 0.5 gram of hydroquinone was added to the mixture to prevent polymerization of the acrylic acid. The reaction mixture was heated to 105°C. for 18 hours during which period two phases formed. The heavy oil layer was separated from the aqueous phase, dried and distilled. The purified material was analyzed and it was ascertained that none of the monosulfate was esterified to the ester $(CF_3)_2CFOCF_2CF_2CH_2CH_2OCOCH=CH_2$.

Example 3

Attempted Hydrolysis of Bis(1,1,2,2-Tetrahydro-3,3,4,4-Tetrafluoro-4-Heptafluoroisopropoxybutyl) Monosulfate Into a 100 ml. three-neck flask were placed 19 grams (0.026 mole) of bis(1,1,2,2-tetrahydro-3,3,4,4-tetrafluoro-4-heptafluoroisopropoxybutyl) monosulfate having the formula $[(CF_3)_2CFOCF_2CF_2CH_2O]_2SO_2$, b.p. 105–110°C./1 mm., and 55 ml. of 50% $H_2SO_4$. The mixture was heated to 105°C. with stirring for three hours. At the end of this period the organic product was extracted with ether, dried and distilled. Analysis of the purified material indicated that only the starting monosulfate material, b.p. 105–110°C./1 mm., was recovered.

EXAMPLE 4

Conversion of Bis(1,1,2,2-Tetrahydro-3,3,4,4-Tetrafluoro-4-Heptafluoroisopropoxybutyl) Monosulfate to Bis(1,1,2,2-Tetrahydro-3,3,-4,4-Tetrafluoro-4-Heptafluoroisopropoxybutyl) Pyrosulfate with $SO_3$ Into a 100 ml. Fisher and Porter aerosol compatibility tube, equipped with a pressure gauge, were placed 26.5 grams (0.0367 mole) of bis(1,1,2,2-tetrahydro- 3,3,4,4-tetrafluoro-4-heptafluoroisopropoxybutyl) monosulfate and 13 grams (0.16 mole) of sulfur trioxide. The mixture was heated to 100°C. for 18 hours. At the end of this period, the liquid product, 38 grams, was distilled. The following fractions were obtained:
First Fraction - 9.5 g. (0.12 mole) of $SO_3$.
Second fraction - 18.5 g. (0.0256 mole) of starting material ](CF_3)_2CFOCF_2CF_2CH_2CH_2O]_2SO_2$, b.p. 100–105°C./1 mm.
Third fraction - 6 g. (0.0075 mole) of bis(1,1,2,2-tetrahydro-3,3,4,4-tetrafluoro-4-heptafluoroisopropoxybutyl) pyrosulfate [$(CF_3)_2CFOCF_2CF_2CH_2CH_2OSO_2]_2O$, b.p. 110–117°C./1 mm.
Calculated for $C_{14}F_{22}H_8S_2O_9$:
C, 20.95; F, 52.12; H, 0.997; S, 7.91.
Found: C, 19.7; F, 51.7; H, 1.5; S, 7.43.

EXAMPLE 5

Preparation of
Bis(1,1,2,2-Tetrahydro-3,3,4,4-Tetrafluoro-4-Heptafluoroisopropoxybutyl) Pyrosulfate Into a glass lined pressure reaction vessel equipped with a pressure gauge and magnetic stirrer, connected to a Dry Ice-acetone cooled trap there was charged 70 grams of 1-iodo-1,1,2,2-tetrahydro-3,3,4,4-tetrafluoro-4-heptafluoroisopropoxy-butane, $(CF_3)_2CFOCF_2CF_2CH_2CH_2I$. 50 Grams of sulfur trioxide were slowly added thereto with ice-cooling. The reaction vessel was sealed and heated to 95°–100°C. for 16 hours during which the pressure increased to 70 p.s.i.g. and two liquid phases were formed. After the liquid phases were separated, the upper layer of the two-phase system was heated to 90°C./2 mm. for 3 hours to remove volatiles which are subsequently identified as sulfur troxide and iodine. There were recovered 67 grams of an amber colored viscous oil boiling point - 120°C./1 mm.), identified, as the pyrosulfate $(CF_3)_2CFOCF_2CF_2CH_2CH_2O(SO_3)_2CH_2CH_2CF_2CF_2OCF—(CF_3)_2$. Analysis: Calculated for $C_{14}F_{22}H_8S_2O_9$: C, 20.95; F, 52.12; H, 0.997; S, 7.91. Found: C, 21.5; F, 51,8; H, 105; S, 8.25.

EXAMPLE 6

Preparation of
1,1,2,2-Tetrahydro-3,3,4,4-Tetrafluoro-4-Heptafluoroisopropoxybutyl Acrylate Into a reaction vessel equipped with a stirrer, reflux condenser and thermometer, there were placed 25 grams of bis(1,-1,2,2-tetrahydro-3,3,4,4-tetrafluoro-4-heptafluoroisopropoxybutyl) pyrosulfate and 14 grams of acrylic acid. The mixture was then heated to 105°C. for 24 hours during which two liquid phases formed in the reaction vessel. The liquid contents of the reaction vessel were cooled to room temperature and the two liquid phases were separated. The lower water insoluble phase (25 grams) was distilled to yield 10 grams (95% yield) of 1,1,2,2-tetrahydro-3,3,4,4-tetrafluoro-4-heptafluoroisopropoxybutyl acrylate having the structure formula $(CF_3)_2CFOCF_2CF_2CH_2CH_2OCOCH=CH_2$ having a boiling point of 56°C./4 mm.

EXAMPLE 7

Preparation of
Bis(1,1,2,2-Tetrahydro-3,3,4,4-Tetrafluoro-4-Heptafluoroisopropoxybutyl) Trisulfate Into a glass lined pressure reaction vessel equipped with a pressure gauge and magnetic stirrer, connected to a Dry Ice-acetone cooled trap there were charged 60 grams of 1-iodo-1,1,2,2-tetrahydro-3,3,4,4-tetrafluoro-4-heptafluoroisopropoxybutane, $(CF_3)_2CFOCF_2CF_2CH_2CH_2I$. 50 Grams of sulfur trioxide were slowly added thereto with ice-cooling. The reaction vessel was sealed and heated to 95°–100°C. for 16 hours during which the pressure increased to 80 p.s.i.g. and two liquid phases were formed. After the liquid phases were separated, the upper layer of the two-phase system was heated to 60°C./2 mm. for one-half hour to remove volatiles which were subsequently identified as sulfur trioxide and iodine. There were recovered 52 grams of the trisulfate $(CF_3)_2CFOCF_2CH_2CH_2O(SO_3)_3CH_2CH_2CF_2CF_2OCF(CF_3)_2$, an amber viscous oil which decomposed on distillation. Analysis: Calculated for $C_{14}F_{22}H_8S_3O_{12}$: C, 18.82; F, 47.28; H, 0.90; S, 10.88. Found: C, 19.10; F, 47.7; H, 1.02; S, 10.62.

EXAMPLE 8

Preparation of
Bis(1,1,2,2-Tetrahydrododecafluoro-8-Heptafluoroisopropoxyoctyl) Pyrosulfate A 250 ml. three-neck flask, connected to a Dry Ice-acetone cooled trap was charged with 56 grams (0.0875 mole) of 1-iodo--tetrahydrododecafluoro-8-heptafluoroisopropoxyoctane, $(CF_3)_2CFO-CF_2CF_2-(CF_2CF_2)_2-CH_2CH_2I$, (boiling point 94–97°C./15 min.). To the flask there were slowly added 33 grams (0.41 mole) of stabilized sulfur trioxide (commercially available under the trade name Sulfan) with stirring. The mixture was then heated to 70°C. for 2 hours during which two liquid phases were formed. The liquid reaction mixture was cooled to room temperature andthe gaseous constituents present in the flask were then vented to a Dry Ice-acetone trap; the trap material was subsequently identified as sulfur dioxide. After the two liquid phases were separated, the upper phase (54 grams) of the resultant two phase system was heated to 80°C./2 mm for 2 hours to remove volatiles such as sulfur trioxide and iodine. There were recovered 46 grams 0.038 mole, 74% yield of a solid having the formula [$(CF_3)_2CFOCF_2CF_2(CF_2CF_2)_2CH_2CH_2OSO_2]_2O$ (melting point 57–58°C.). Analysis: Calculated for $C_{22}F_{38}H_8S_2O_9$: F, 60.00; H, 0.066; C, 21.93; S, 5.32. Found: C, 22.9; F, 59.46; H, 0.085; S, 6.00.

EXAMPLE 9

Preparation of
Bis(1,1,2,2-Tetrahydrooctafluoro-6-Heptafluoroisopropoxyhexyl) Pyrosulfate Into a reaction vessel of the type described in Example 1 there were charged 61 grams (0.113 mole) of 1-iodo-1,1,2,2-tetrahydrooctafluoro-6-heptafluoroisopropoxyhexane, $(CF_3)_2CFOCF_2-CF_2CF_2CF_2CH_2CH_2I$, (boiling point 75–76°C./15 mm). To the reaction vessel there were then slowly added 35 grams (0.44 mole) of stabilized sulfur trioxide. The mixture was heated to 60°C. for a period of about 3 hours during which two liquid phases were formed. The liquid reaction mixture was cooled to room temperature and the gaseous constituents present in the flask were then vented to a Dry Ice-acetone trap; the trap material (about 5 grams) was identified as sulfur dioxide. After the two liquid phases were separated, the upper phase (68 grams) of the resultant two phase system was heated to 65°C./2 mm for two hours to remove volatiles such as sulfur trioxide and iodine. There were recovered 57 grams (0.057 mole, 100 % yield) of a solid having the formula [(CF$_3$)$_2$CFOCF$_2$CF$_2$CF$_2$CF$_2$CH$_2$CH$_2$OSO$_2$]$_2$O (melting point - 29-31°C.). Analysis: Calculated for C$_{18}$F$_{30}$H$_8$S$_2$O$_9$: C, 21.54; F, 56.89; H, 0.80; S, 6.39. Found: C, 21,70; F, 56.2; H, 0.75; S, 6.75.

EXAMPLE 10

Preparation of 1,1,2,2-Tetrahydrooctafluoro-6-Heptafluoroisopropoxyhexyl Acrylate Into a reaction vessel equipped with a stirrer, reflux condenser and thermometer, there were placed 51 grams of bis-(1,1,2,2-tetrahydrooctafluoro-6-heptafluoroisopropoxyhexyl) pyrosulfate and 15 grams of acrylic acid. The mixture was then heated to 105°C. for 24 hours during which two liquid phases form in the reaction vessel. The liquid contents of the reaction vessel were cooled to room temperature and the two liquid phases were separated. The lower water insoluble phase (45 grams) was distilled to yield 38 grams (70% yield) of 1,1,2,2-tetrahydrooctafluoro-6-heptafluoroisopropoxyhexyl acrylate having the structural formula

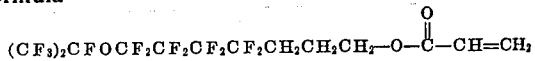

having a boiling point of 48-51°C./1.5 mm.

EXAMPLE 11

Preparation of Bis(1,1,2,2-Tetrahydrododecafluoro-8-Heptafluoroisopropoxyoctyl) Trisulfate Into a reaction vessel of the type described in Example 1 there were charged 60 grams (0.094 mole) of 1-iodo-1,1,2,2-tetrahydrododecafluoro-8-heptafluoroisopropoxyoctane, (CF$_3$)$_2$-CFO-CF$_2$CF$_2$-(CF$_2$CF$_2$)$_2$-CH$_2$CH$_2$I, (boiling point 94-97°C./15 mm). To the reaction vessel there were then slowly added 40 grams (0.50 mole) of stabilized sulfur trioxide. The mixture was heated to 60°C. for a period of about three hours during which two liquid phases were formed. The liquid reaction mixture was cooled to room temperature and the gaseous constituents present in the flask were then vented to a Dry Ice-acetone trap. The trap material (about 4 grams) was identified as sulfur dioxide. After the two liquid phases were separated, the upper phase (65 grams) of the resultant two phase system was heated to 60°C./2 mm for one-half hour to remove volatiles such as sulfur trioxide and iodine. There were recovered 55 grams (0.043 mole, 92% yield) of a solid having the formula [(CF$_3$)$_2$CFOCF$_2$CF$_2$(CF$_2$CF$_2$)$_2$CH$_2$CH$_2$]$_2$-(SO$_3$)$_3$O; melting point 64-66°C. Analysis: Calculated for C$_{22}$F$_{38}$H$_8$S$_3$O$_{12}$: C, 20.59; F, 56.32; H, 0.063; S, 7.49. Found: C, 21.2; F, 57.5; H, 0.080; S, 7.25.

EXAMPLE 12

Preparation of Bis(1,1,2,2-Tetrahydrooctafluoro-6-Heptafluoroisopropoxyhexyl) Monosulfate Into a reaction vessel of the type described in Example 1 there were charged 61 grams (0.113 mole) of 1-iodo-1,1,2,2-tetrahydrooctafluoro-6-heptafluoroisopropoxyhexane, (CF$_3$)$_2$CFOCF$_2$CF$_2$-CF$_2$CF$_2$CH$_2$CH$_2$I, (boiling point 75-76°C./15 mm.). To the reaction vessel there were then slowly added 26 grams (0.325 mole) of stabilized sulfur trioxide. The mixture was heated to 60°C. for a period of about 3 hours during which two liquid phases were formed. The liquid reaction mixture was cooled to room temperature and the gaseous constituents present in the flask were then vented to a Dry Ice-acetone trap. The trap material (about 2.8 grams) was identified as sulfur dioxide. After the two liquid phases were separated, the upper phase (65 grams) of the resultant two phase system was heated to 125°C./1 mm. for 2 hours to remove volatiles such as sulfur trioxide and iodine. There were recovered 46 grams (0.05 mole, 94% yield) of a solid having the formula [(CF$_3$)$_2$CFOCF$_2$CF$_2$CF$_2$CF$_2$CH$_2$CH$_2$O]$_2$SO$_2$. Analysis: Calculated for C$_{18}$F$_{30}$H$_8$SO$_6$: C, 23.43; F, 61.82; H, 09087; S, 3.47. Found: C, 24.20; F, 62.15; H, 0.096; S, 4.02.

EXAMPLE 13

Preparation of

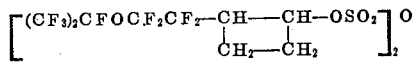

Into a 500 ml. three-neck flask, connected to a Dry Ice-acetone cooled trap, are placed 100 grams (0.215 mole) of

To the flask there are slowly added, with stirring, 72 grams (0.90 mole) of stabilized sulfur trioxide. By virtue of the Dry Ice cooling, temperature in the reaction flask during the addition of sulfur trioxide is maintained between about 30-35°C. After the addition is complete the mixture is heated to a temperature between about 60-70°C. for 6 hours during which period two liquid phases are formed. The two-phase system is then separated. 115 Grams of a light colored upper phase oil and 50 grams of a dark colored lower phase oil are recovered. Gaseous constituents present in the flask are vented to the Dry Ice-acetone trap. The trap material is found to consist of 14 grams (0.22 mole) of SO$_2$. The 115 grams of light colored oil separated from the upper phase system are heated to 80°C./2 mm. for 2 hours to remove volatiles such as SO$_2$, SO$_3$, and I$_2$. There are recovered 92 grams (0.107 mole) of an amber colored viscous oil corresponding to the pyrosulfate,

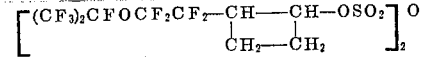

EXAMPLE 14

Preparation of [(CF$_3$)$_2$CFOCF$_2$CF$_2$CFHOSO$_2$]$_2$

Into a 250 ml. three-neck flask, connected to a Dry Ice-acetone cooled trap, are placed 61 grams (0.124 mole) of (CF$_3$)$_2$CFOCF$_2$CF$_2$CF$_2$CFHI. To the flask there are slowly added, with stirring, 35 grams (0.44 mole) of stabilized sulfur trioxide. By virtue of the Dry Ice cooling, temperature in the reaction flask during the addition of sulfur trioxide is maintained between about 30-35°C. After the addition is complete the mixture is heated to a temperature between about 60–70°C. for three hours during which period two liquid phases are formed. The two phase system is then separated. Gaseous constituents present in the flask are vented to the Dry Ice-acetone trap. The trap material is found to consist of 5 grams (0.06 mole) of $SO_2$. The upper layer of the two phase system, 70 grams, is heated to 65°C./2 mm. for 2 hours, to remove volatiles such as $SO_2$, $SO_3$ and $I_2$. There are recovered 57 grams (0.62 mole) of the pyrosulfate $[(CF_3)_2CFOCF_2CF_2CF_2CFHOSO_2]_2$.

Additional illustrative bis(polyhaloisoalkoxyalkyl) sulfate compounds are listed in following Table I. These compounds are prepared by reaction of the polyhaloisoalkoxyalkyl halide reactants described with sulfur trioxide in a manner analogous to that described in the above examples.

TABLE I

| Example: | Polyhaloisoalkoxyalkyl halide reactant | Bias (polyhaloisoalkoxyalkyl) sulfate product |
|---|---|---|
| 15 | $CF_2-(CF_2)_4CFOCF_2CH_2CH_2CH_2I$ | $[CF_2-(CF_2)_4CFOCF_2CH_2CH_2CH_2]_2(OSO_2)_2O$ |
| 16 | $CF_2-(CF_2)_2CFOCHCH_2CH_2CHCH_2I$ | $[CF_2-(CF_2)_2CFOCHCH_2CH_2CHCH_2]_2(OSO_2)_2O$ |
| 17 | $(CF_2Cl)(CF_3)CFOCFHCH_2CH_2CH_2I$ | $[(CF_2Cl)(CF_3)CFOCFHCH_2CH_2CH_2]_2(OSO_2)_3O$ |
| 18 | $(CF_3)_2CFOCF_2CF \cdot (CF_2)_8F]CH_2CH_2I$ | $[(CF_3)_2CFOCF_2CF[(CF_2)_8F]CH_2CH_2]_2(OSO_2)_2O$ |
| 19 | $(CF_3)[(CF_2)_3F]CFOCF_2CF_2CH_2CH_2I$ | $[(CF_3)[(CF_2)_3F]CFOCF_2CF_2CH_2CH_2]_2(OSO_2)_4O$ |
| 20 | $(CF_3)_2CFOCH(C_3H_7)CH_2CH_2CH_2I$ | $[(CF_3)_2CFOCH(C_3H_7)CH_2CH_2CH_2]_2(OSO_2)_2O$ |
| 21 | $[F(CF_2)_3]_2CFOCF_2CFClCH_2CH_2I$ | $[(F(CF_2)_3]_2CFOCF_2CFClCH_2CH_2]_2(OSO_2)_2O$ |
| 22 | $(CF_3)_2CFOCF_2CF(CF_3)CH_2CH_2I$ | $[(CF_3)_2CFOCF_2CF(CF_3)CH_2CH_2]_2(OSO_2)_3O$ |
| 23 | $(CF_3)_2CFOCH(C_8H_{17})CH_2CH_2CH_2I$ | $[(CF_3)_2CFOCH(C_8H_{17})CH_2CH_2CH_2]_2(OSO_2)_2O$ |
| 24 | $(C_3F_7)_2CFOCF_2CF_2CH_2CH_2I$ | $[(C_3F_7)_2CFOCF_2CF_2CH_2CH_2]_2(OSO_2)_2O$ |
| 25 | $CFCl-(CFCl)_5CFOCF_2CFBrCH_2CH_2I$ | $[CFCl-(CFCl)_5CFOCF_2CFBrCH_2CH_2]_2(OSO_2)_3O$ |
| 26 | $[F(CF_2)_8]_2CFOCHFCH_2CH_2CH_2Br$ | $[(F(CF_2)_8]_2CFOCHFCH_2CH_2CH_2]_2(OSO_2)_3O$ |
| 27 | $(CF_3)_2CFOCH(C_2H_5)CH_2CH_2CH_2Br$ | $[(CF_3)_2CFOCH(C_2H_5)CH_2CH_2CH_2]_2(OSO_2)_3O$ |
| 28 | $(C_4F_9)_2CFOCF_2CF(CF_3)CH_2CH_2Br$ | $[(C_4F_9)_2CFOCF_2CF(CF_3)CH_2CH_2]_2(OSO_2)_2O$ |
| 29 | $(CF_2Cl)_2CFOCClHCClHCF_2CH_2CH_2I$ | $[(CF_2Cl)_2CFOCClHCClHCF_2CH_2CH_2]_2(OSO_2)_2O$ |
| 30 | $(C_4H_9)(CF_3)CFOCF_2CH(C_3F_7)CH_2CH_2I$ | $[(C_4F_9)(CF_3)CFOCF_2CH(C_3F_7)CH_2CH_2]_2(OSO_2)_2O$ |
| 31 | $[F(CF_2)_3]_2CFOCClHCHClCH_2CH_2I$ | $[(F(CF_2)_3]_2CFOCClHCHClCH_2CH_2]_2(OSO_2)_6O$ |
| 32 | $(CF_2H)_2CFOCH(CH_3)CH(C_2H_5)CH_2CH_2I$ | $[(CF_2H)_2CFOCH(CH_3)CH(C_2H_5)CH_2CH_2]_2(OSO_2)_3O$ |
| 33 | $(CF_3)_2CFOCF_2CF_2CH_2I$ | $[(CF_3)_2CFOCF_2CF_2CH_2]_2(OSO_2)_3O$ |
| 34 | $(CFCl_2)(CF_3)CFOCFHCH_2CH_2I$ | $[(CFCl_2)(CF_3)CFOCFHCH_2CH_2]_2(OSO_2)_2O$ |
| 35 | $(CF_3)_2CFOCF_2CF[(CF_2)_8F]CH_2Br$ | $[(CF_3)_2CFOCF_2CF[(CF_2)_8F]CH_2]_2(OSO_2)_2O$ |
| 36 | $(CF_3)[(CF_2)_3F]CFOCF_2CF_2CH_2I$ | $[(CF_3)[(CF_2)_3F]CFOCF_2CF_2CH_2]_2(OSO_2)_3O$ |
| 37 | $(C_3F_7)_2CFOCF_2CF_2CH_2CH(CH_2)_3CHBr$ | $[(C_3F_7)_2CFOCF_2CF_2CH_2CH(CH_2)_3CH]_2(OSO_2)_3O$ |
| 38 | $(CF_3)_2CFOCF_2CH_2I$ | $[(CF_3)_2CFOCF_2CH_2]_2(OSO_2)_2O$ |
| 39 | $(CF_3)_2CFOCF_2CH_2CH_2CH_2CH_2I$ | $[(CF_3)_2CFOCF_2CH_2CH_2CH_2CH_2]_2(OSO_2)_2O$ |
| 40 | $(CF_3)_2CFOCH_2CH_2I$ | $[(CF_3)_2CFOCH_2CH_2]_2(OSO_2)_2O$ |
| 41 | $(C_3F_7)_2CFOCF_2CF_2CH_2CH_2CH_2I$ | $[(C_3F_7)_2CFOCF_2CF_2CH_2CH_2CH_2]_2(OSO_2)_2O$ |
| 42 | $(CF_3)_2CFOCH(C_2H_5)CH_2CH_2I$ | $[(CF_3)_2CFOCH(C_2H_5)CH_2CH_2]_2(OSO_2)_3O$ |
| 43 | $(CFH_2)_2CFOCF_2CHFI$ | $[(CFH_2)_2CFOCF_2CHF]_2(OSO_2)_2O$ |
| 44 | $(CF_3)(C_4F_9)CFOCF_2CF(C_3F_7)CH_2I$ | $[(CF_3)(C_4F_9)CFOCF_2CF(C_3F_7)CH_2]_2(OSO_2)_3O$ |
| 45 | $[F(CF_2)_8]_2CFOCHFCH_2CH_2I$ | $[(F(CF_2)_8]_2CFOCHFCH_2CH_2]_2(OSO_2)_2O$ |
| 46 | $(C_3F_7)_2CFOCF_2CF_2CH_2I$ | $[(C_3F_7)_2CFOCF_2CF_2CH_2]_2(OSO_2)_2O$ |
| 47 | $(CF_3)_2CFOCF_2CH_2(CF_2CF_2)_mCH_2CH_2I$<br>$m=1–3$ | $[(CF_3)_2CFOCF_2CH_2(CF_2CF_2)_mCH_2CH_2]_2(OSO_2)_2O$<br>$m=1–3$ |
| 48 | $(CF_3)_2CFOCF_2CF_2(CF_2CF_2)_mCH_2CH_2CH_2I$<br>$m=1–3$ | $[(CF_3)_2CFOCF_2CF_2(CF_2CF_2)_mCH_2CH_2CH_2]_2(OSO_2)_2O$<br>$m=1–3$ |
| 49 | $(CF_2Cl)(CF_3)CFOCFHCH_2(CF_2CF_2)_mCH_2CH_2I$<br>$m=1–4$ | $[CF_2Cl)(CF_3)CFOCFHCH_2(CF_2CF_2)_mCH_2CH_2]_2(OSO_2)_3O$<br>$m=1–4$ |
| 50 | $(CF_3)_2CFOCF_2CF[(CF_2)_8F]CF_2CH_2CH_2CH_2I$ | $[(CF_3)_2CFOCF_2CF[(CF_2)_8F]CF_2CH_2CH_2CH_2]_2(OSO_2)_2O$ |
| 51 | $(CF_3)[(CF_2)_3F]CFOCF_2CF_2(CFHCF_2)_mCH_2CH_2I$<br>$m=1–4$ | $[(CF_3)[(CF_2)_3F]CFOCF_2CF_2(CFHCF_2)_mCH_2CH_2]_2(OSO_2)_4O$<br>$m=1–4$ |
| 52 | $(CF_3)_2CFOCH(C_3H_7)CH_2(CF_2CF_2)_mCH_2CH_2I$<br>$m=1–5$ | $[(CF_3)_2CFOCH(C_3H_7)CH_2(CF_2CF_2)_mCH_2CH_2]_2(OSO_2)_2O$<br>$m=1–5$ |
| 53 | $[F(CF_2)_3]_2CFOCFHCFCl(CF_2CF_2)_mCH_2CH_2I$<br>$m=1–3$ | $[(F(CF_2)_3]_2CFOCFHCFCl(CF_2CF_2)_mCH_2CH_2]_2(OSO_2)_2O$<br>$m=1–3$ |

TABLE I - Continued

| | | |
|---|---|---|
| 54 | $(CF_3)_2CFOCF_2CFBrCF_2CFHCF_2CH_2CH_2I$ | $[(CF_3)_2CFOCF_2CFBrCF_2CFHCF_2CH_2CH_2]_2(OSO_2)_3O$ |
| 55 | $(CF_3)_2CFOCH(C_8H_{17})CH_2(CF_2CF_2)_mCH_2CH_2I$<br>$m=1-2$ | $[(CF_3)_2CFOCH(C_8H_{17})CH_2(CF_2CF_2)_mCH_2CH_2]_2(OSO_2)_2O$<br>$m=1-2$ |
| 56 | $(C_3F_7)_2CFOCF_2CF_2(CH_2CF_2)_m(CH_2CH_2)_nI$<br>$m=1-75$ $n=1-75$ | $[(C_3F_7)_2CFOCF_2CF_2(CH_2CF_2)_m(CH_2CH_2)_n]_2(OSO_2)_2O$<br>$m=1-75$ $n=1-75$ |
| 57 | $[F(CFCl)_5]_2CFOCF_2CFBr(CH_2CF_2)_mCH_2CH_2I$<br>$m=1-2$ | $([F(CFCl)_5]_2CFOCF_2CFBr(CH_2CF_2)_mCH_2CH_2)_2(OSO_2)_3O$<br>$m=1-2$ |
| 58 | $[F(CF_2)_8]_2CFOCHFCH_2CF_2CF_2CH_2CH_2I$ | $([F(CF_2)_8]_2CFOCHFCH_2CF_2CF_2CH_2CH_2)_2(OSO_2)_3O$ |
| 59 | $(CF_3)_2CFOCH(C_2H_5)CH_2CF_2CF_2CH_2CH_2I$ | $[(CF_3)_2CFOCH(C_2H_5)CH_2CF_2CF_2CH_2CH_2]_2(OSO_2)_3O$ |
| 60 | $(C_{10}F_{21})_2CFOCF_2CF(CF_3)(CF_2CH_2)_mCH_2CH_2I$<br>$m=1-5$ | $[(C_{10}F_{21})_2CFOCF_2CF(CF_3)(CF_2CH_2)_mCH_2CH_2]_2(OSO_2)_2O$<br>$m=1-5$ |
| 61 | $(CF_2Cl)_2CFOCF_2CFClCF_2CFHCF_2CH_2CH_2I$ | $[(CF_2Cl)_2CFOCF_2CFClCF_2CFHCF_2CH_2CH_2]_2(OSO_2)_2O$ |
| 62 | $(C_4F_9)(CF_3)CFOCF_2CF(C_3F_7)(CF_2CF_2)_mCH_2CH_2I$<br>$m=1-3$ | $[C_4F_9)(CF_3)CFOCF_2CF(C_3F_7)(CF_2CF_2)_mCH_2CH_2]_2(OSO_2)_2O$<br>$m=1-3$ |
| 63 | $[F(CF_2)_3]_2CFOCH_2CCl_2CF_2CF_2CH_2CH_2I$ | $([F(CF_2)_3]_2CFOCH_2CCl_2CF_2CF_2CH_2CH_2)_2(OSO_2)_6O$ |
| 64 | $(CF_2Cl)_2CFOCFHCBrH(CH_2CH_2)_mCH_2CH_2I$<br>$m=1-4$ | $[(CF_2Cl)_2CFOCFHCBrH(CH_2CH_2)_mCH_2CH_2]_2(OSO_2)_3O$<br>$m=1-4$ |
| 65 | $(CF_3)_2CFOCF_2CF_2(CH_2CH_2)_mCH_2I$<br>$m=1-5$ | $[CF_3)_2CFOCF_2CF_2(CH_2CH_2)_mCH_2]_2(OSO_2)_3O$<br>$m=1-5$ |
| 66 | $(CF_2Cl)(CF_3)CFOCFHCH_2(CFHCF_2)_mCH_2I$<br>$m=1-3$ | $[(CF_2Cl)(CF_3)CFOCFHCH_2(CFHCF_2)_mCH_2]_2(OSO_2)_3O$<br>$m=1-3$ |
| 67 | $(CF_3)_2CFOCF_2CF[(CF_2)_8F]CF_2CF_2[CF(CF_3)CF_2]_nCH_2I$<br>$n=1-4$ | $[(CF_3)_2CFOCF_2CF[(CF_2)_8F]CF_2CF_2[CF(CF_3)CF_2]_nCH_2]_2(OSO_2)_2O$<br>$n=1-4$ |
| 68 | $(CF_3)[(CF_2)_3F]CFOCF_2CF_2(CClFCF_2)_mCH_2I$<br>$m=1-3$ | $[(CF_3)](CF_2)_3F]CFOCF_2CF_2(CClFCF_2)_mCH_2]_2(OSO_2)_3O$<br>$m=1-3$ |
| 69 | $(C_3F_7)_2CFOCF_2CF_2(CF_2CH_2)_m(CH_2CH_2)_nI$<br>$m=1-4$ $n=1-4$ | $[(C_3F_7)_2CFOCF_2CF_2(CF_2CH_2)_m(CH_2CH_2)_n]_2(OSO_2)_3O$<br>$m=1-4$ $n=1-4$ |
| 70 | $(CF_3)_2CFOCF_2CF(C_3F_7)(CF_2CH_2)_mCH_2CH_2CH_2I$<br>$m=1-3$ | $[(CF_3)_2CFOCF_2CF(C_3F_7)(CF_2CH_3)_mCH_2CH_2CH_2]_2)(OSO_2)_3O$<br>$m=1-3$ |
| 71 | $(CF_3)_2CFOCF_2CH_2(CFHCF_2)_mCH_2CH_2CH_2I$<br>$m=1-4$ | $[(CF_3)_2CFOCF_2CH_2(CFHCF_2)_mCH_2CH_2CH_2]_2(OSO_2)_2O$<br>$m=1-4$ |
| 72 | $(CF_3)_2CFOCF_2CF[(CF_2)_8F](CF_2CF_2)_mCH_2CH_2CH_2I$<br>$m=1-2$ | $[(CF_3)_2CFOCF_2CF[(CF_2)_8F](CF_2CF_2)_mCH_2CH_2CH_2]_2(OSO_2)_2O$<br>$m=1-2$ |
| 73 | $(CF_3)(C_4F_9)CFOCF_2CF(C_3F_7)CF_2CF_2CH_2I$ | $[(CF_3)(C_4F_9)CFOCF_2CF(C_3F_7)CF_2CF_2CH_2]_2(OSO_2)_2O$ |
| 74 | $(CF_3)_2CFOCH(C_2H_5)CH_2(CF_2CF_2)_mCH_2I$<br>$m=1-2$ | $[(CF_3)_2CFOCH(C_2H_5)CH_2(CF_2CF_2)_mCH_2]_2(OSO_2)_3O$<br>$m=1-2$ |
| 75 | $(CF_2Cl)_2CFOCH_2CH_2(CF_2CFH)_mCH_2I$<br>$m=1-2$ | $[(CF_2Cl)_2CFOCH_2CH_2(CF_2CFH)_mCH_2]_2(OSO_2)_2O$<br>$m=1-2$ |
| 76 | $(C_3F_7)_2CFOCF_2CF_2(CH_2CFH)_m(CH_2CH_2)_nI$<br>$n=1-2$ $m=1-5$ | $[(C_3F_7)_2CFOCF_2CF_2(CH_2CFH)_m(CH_2CH_2)_n]_2(OSO_2)_2O$<br>$n=1-2$ $m=1-5$ |
| 77 | $[(CF_2)_8]_2CFOCHFCH_2CF_2CF_2CH_2I$ | $[F(CF_2)_8]_2CFOCHFCH_2CF_2CF_2CH_2)_2(OSO_2)_2O$ |
| 78 | $(C_3F_7)_2CFOCF_2CF_2(CF_2CFH)_mCH_2I$<br>$m=1-3$ | $[(C_3F_7)_2CFOCF_2CF_2(CF_2CFH)_mCH_2]_2(OSO_2)_2O$<br>$m=1-3$ |
| 79 | $(CF_3)_2CFO-CF_2CF_2-(CF_2CF_2)_m-(CF_2CH_2)_n-CH_2CH_2I$<br>$n=1-3$ $m=1-10$ | $[(CF_3)_2CFO-CF_2CF_2-(CF_2CF_2)_m-(CF_2CH_2)_n-CH_2CH_2]_2(OSO_2)_2O$<br>$n=1-3$ $m=1-10$ |
| 80 | $(CF_3)_2CFO-CF_2CH_2(CH_2CH_2)_m-(CF_2CF_2)_n-CH_2CH_2I$<br>$n=1-4$ $m=1-10$ | $[(CF_3)_2CFO-CF_2CH_2(CH_2CH_2)_m-(CF_2CF_2)_n-CH_2CH_2]_2(OSO_2)_2O$<br>$n=1-4$ $m=1-10$ |
| 81 | $(CF_3)_2CFO-CF_2CF_2-(CF_2CCl_2)_m-(CF_2CF_2)_n-CH_2CH_2I$<br>$n=1-3$ $m=1-10$ | $[(CF_3)_2CFO-CF_2CF_2-(CF_2CCl_2)_m-(CF_2CF_2)_n-CH_2CH_2]_2(OSO_2)_2O$<br>$n=1-3$ $m=1-10$ |
| 82 | $(CF_3)_2CFO-CF_2CF_2-(CH_2CH_2)_m-(CClCFF_2)_nCH_2CH_2I$<br>$n=1-3$ $m=1-10$ | $[(CF_3)_2CFO-CF_2CF_2-(CH_2CH_2)_m-(CClFCF_2)_nCH_2CH_2]_2(OSO_2)_2O$<br>$n=1-3$ $m=1-10$ |
| 83 | $(CF_3)_2CFO-CF_2CF_2-[CF(CF_3)CF_2]_m-$<br>$(CF_2CF_2)_nCH_2CH_2I$<br>$n=1-3$ $m=1-10$ | $[(CF_3)_2CFO-CF_2CF_2-[CF(CF_3)CF_2]_m-(CF_2CF_2)_nCH_2CH_2]_2(OSO_2)_2O$<br>$n=1-3$ $m=1-10$ |
| 84 | $(CF_3)_2CFO-CF_2CF_2(CF_2CH_2)_m-(CF_2CF_2)_n-CH_2CH_2I$<br>$n=1-3$ $m=1-10$ | $[(CF_3)_2CFO-CF_2CF_2(CF_2CH_2)_m-(CF_2CF_2)_n-CH_2CH_2]_2(OSO_2)_2O$<br>$n=1-3$ $m=1-10$ |

Since various changes and modifications may be made in the invention without departing from the spirit thereof it is intended that all matter contained in the above description be interpreted as illustrative and not in a limiting sense.

We claim:
1. Compounds having the formula:

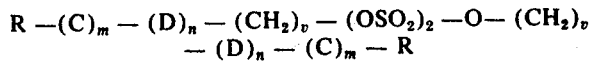

wherein R is a polyhaloisoalkoxyalkyl group having the formula:

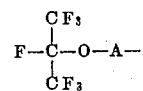

wherein:
a. A is a member selected from the group consisting of radicals of the formulae: —CHR₃—CHR₄—, CFR₅—CR₆R₇— and

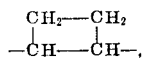

wherein R₃ and R₄ are independently selected from the group consisting of Cl, H and alkyl having from 1–8 carbon atoms; R₅ and R₆ are independently selected from the group consisting of F and H; R₇ is selected from the group consisting of F, H, Cl, Br and trifluoromethyl; with the proviso that when both R₆ and R₇ are F, R₅ is always F; and
b. C and D are selected from the following: —CF₂CF₂—, —CF₂CH₂—, —CF₂CClF—, —CF₂CF(CF₃)— and —CH₂CH₂—;
c. m is an integer of from 1 to 75;
d. n is an integer of from 0 to 75; and
e. v is an integer of from 0 to 1, with the proviso that each carbon atom which is directly bonded to the —(SO₂)₂—O— moiety contains at least 1 hydrogen atom and with the further proviso that both (C)ₘ groups are the same and both (D)ₙ groups are the same.

2. A sulfate compound as defined in claim 1 which is (CF₃)₂CFOCF₂CF₂CH₂CH₂—(OSO₂)₂—O—CH₂CH₂CF₂CF₂OCF(CF₃)₂.

3. A sulfate compound as defined in claim 1 which is (CF₃)₂CFOCF₂CF₂(CF₂CF₂)₂CH₂CH₂—(OSO₂)₂—O—CH₂CH₂(CF₂CF₂)₂—CF₂CF₂OCF(CF₃)₂.

4. A sulfate compound as defined in claim 1 which is (CF₃)₂CFOCF₂CF₂CF₂CF₂CH₂CH₂—(OSO₂)₂—O—CH₂CH₂CF₂CF₂CF₂CF₂—OCF(CF₃)₂.

5. Compounds as defined in claim 1 wherein A is a —CF₂CF₂— moiety.

6. Compounds as defined in claim 5 wherein (C)ₘ is —(CF₂CH₂)ₘ— and wherein n is zero.

7. Compounds as defined in claim 5 wherein (C)ₘ is —(CH₂CH₂)ₘ— and wherein n is zero.

8. Compounds as defined in claim 5 wherein the —C— moieties are —CF₂CF₂—.

9. Compounds as defined in claim 8 wherein the D moieties are —CH₂CH₂—.

10. The process for preparing a sulfate compound of the formula:

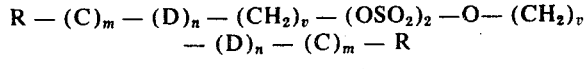

wherein R is a polyhaloisoalkoxyalkyl group having the formula:

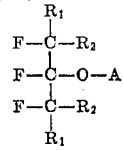

wherein:
a. R₁ and R₂ are F, Cl, alkyl or haloalkyl groups or when taken together, are haloalkylene groups forming a cycloaliphatic structure, which R₁ and R₂ groups may each have from one to six carbon atoms and which halogen atoms, if any, have an atomic weight not exceeding about 79.92, with the proviso that no more than two of the four R₁ and R₂ groups are alkyl groups and
b. A is a member selected from the group consisting of radicals of the formulae: —CHR₃—CHR₄—, —CFR₅—CR₆R₇— and

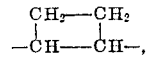

wherein R₃ and R₄ are independently selected from the group consisting of Cl, H and alkyl having from 1–8 carbon atoms; R₅ and R₆ are independently selected from the group consisting of F and H; R₇ is selected from the group consisting of F, H, Cl, Br and trifluoromethyl; with the proviso that when both R₆ and R₇ are F, R₅ is always F; and
c. C and D are selected from the following: —CF₂CF₂—, —CF₂CH₂—, —CF₂CClF—, —CF₂CF(CF₃)— and —CH₂CH₂—;
d. m is an integer of from 1 to 75;
e. n is an integer of from 0 to 75;
f. v is an integer of from 0 to 1, with the proviso that each carbon atom which is directly bonded to the —(SO₂)₂—O— moiety contains at least 1 hydrogen atom and with the further proviso that both (C)ₘ groups are the same and both (D)ₙ groups are the same;

which comprises reacting a polyhaloisoalkoxyalkyl halide corresponding to the general formula:

wherein R, C, C, m, n and v are as defined above, and wherein E is a bromine atom or an iodine atom, with sulfur trioxide in at least about the stoichiometric proportions for the reaction.

11. The process of claim 10 wherein the R₁ and R₂ groups are each F or perfluoroalkyl groups.

12. The process of claim 11 wherein the R₁ and R₂ groups are each F.

13. The process of claim 12 wherein the sulfate compound produced is (CF₃)₂CFOCF₂CF₂(CF₂CF₂)₂CH₂CH₂—(OSO₂)₂—O—CH₂—CH₂(CF₂CF₂)₂CF₂CF₂OCF(CF₃)₂.

14. The process of claim 12 wherein the sulfate compound produced is (CF₃)₂CFOCF₂CF₂CF₂CF₂CH₂CH₂—(OSO₂)₂—O—CH₂CH₂—CF₂CF₂CF₂CF₂OCF(CF₃)₂.

* * * * *

UNITED STATES PATENT OFFICE
CERTIFICATE OF CORRECTION

Patent No. U.S.P. 3,758,543    Dated September 11, 1973

Inventor(s) LOUIS G. ANELLO and RICHARD F. SWEENEY

It is certified that error appears in the above-identified patent and that said Letters Patent are hereby corrected as shown below:

In the Abstract, 6 lines from the bottom - "to the polyacrylate" should read -- to form the polyacrylate --;

Col. 1, line 14 - "Apr. 25, 2967" should read -- Apr. 25, 1967 --;

Col. 2, line 31 - "group of F" should read -- group consisting of F --;

Col. 3, line 20 - "Moredetails" should read -- More details --;

Col. 5, line 51 - "acetylenically eth-" should read -- acetylenically or eth- --;

Col. 6, line 3 - "Then" should read -- When --;

Col. 6, line 18 - "telomerisa-" should read -- telomeriza- --;

Col. 7, line 21 - "1 moles" should read -- 1.5 moles --;

Col. 8, line 8 - "1,1,1,3,4,-4,4-" should read -- 1,1,1,3,4,4,4- --;

Col. 8, line 17 - "If desired individual" should read -- If desired, individual --;

Col. 9, line 3 - "polymers from" should read -- polymers form --;

Col. 9, line 13 - "$R(C)_m-(D)_n 13 (CH_2)_r OH$" should read -- $R(C)_m-(D)_n (CH_2)_v OH$ --;

UNITED STATES PATENT OFFICE
CERTIFICATE OF CORRECTION

Page 2

Patent No. U.S.P. 3,758,543       Dated September 11, 1973

Inventor(s) LOUIS G. ANELLO and RICHARD F. SWEENEY

It is certified that error appears in the above-identified patent and that said Letters Patent are hereby corrected as shown below:

Col. 10, line 12 - "$R_1 R_2$" should read -- $R_1$ and $R_2$ --;

Col. 10, line 15 - "substition" should read -- substitution --;

Col. 10, line 53 - "$CO_2Y_4$," should read -- $Y_1$-CN, --;

Col. 10, line 60 - "is saturated" should read -- is a saturated --;

Col. 11, line 7 - "$Z_3$ or $Z_4$" should read -- $Z_3$ and $Z_4$ --;

Col. 11, line 22 - "CFhd 2ClCF=$CF_2$," should read -- $CF_2$ClCF=$CF_2$, --;

Col. 11, line 29 - "CHF=CHCF$Cl_2$" should read -- CHF=CFCF$Cl_2$ --

Col. 11, line 30 - "$CF_3$=CF($C_6$H" should read -- $CF_2$=CF($C_6$H --;

Col. 11, lines 38-39 - "$\begin{array}{c} CFCl - CF \\ | \quad\quad | \\ CF_2 - CF \end{array}$" should read -- $\begin{array}{c} CFCl - CF \\ | \quad\quad \| \\ CF_2 - CF \end{array}$ --

"$\begin{array}{c} CF_2 - CCl \\ | \quad\quad | \\ CF_2 - CF \end{array}$" should read -- $\begin{array}{c} CF_2 - CCl \\ | \quad\quad \| \\ CF_2 - CF \end{array}$ --

"$\begin{array}{c} CFCl - CF \\ | \quad\quad | \\ CFCl - CF \end{array}$" should read -- $\begin{array}{c} CFCl - CF \\ | \quad\quad \| \\ CFCl - CF \end{array}$ --

"$\begin{array}{c} CHF - CF \\ | \quad\quad | \\ CHF - CF \end{array}$" should read -- $\begin{array}{c} CHF - CF \\ | \quad\quad \| \\ CHF - CF \end{array}$ --;

UNITED STATES PATENT OFFICE
CERTIFICATE OF CORRECTION

Patent No. U.S.P. 3,758,543     Dated September 11, 1973

Inventor(s) LOUIS G. ANELLO and RICHARD F. SWEENEY

It is certified that error appears in the above-identified patent and that said Letters Patent are hereby corrected as shown below:

Col. 11, line 47 - "$CH_2=CH(CH(CH_2)_9O_2CC_2H_5$," should read
-- $CH_2=CH(CH_2(CH_2)_9OCC_2H_5$, --;

Col. 11, line 48 - "$CH_2=CH(CH_2)_2-O(CH_2)_2OO_2H$," should read
-- $CH_2=CH(CH_2)_2-O(CH_2)_2CO_2H$ --.

Col. 11, line 51 - that part which reads "$(CH_2=CH(CH_2)_2-$"
should read -- $(CH_2=CH(CH_2)_8-$ --;

Col. 11, line 59 - "$C_4H_9C\ CH$ and $HC\ CC_6H_5$." should read
-- $C_4H_9C\equiv CH$ and $HC\equiv CC_6H_5$. --;

Col. 12, 4th formula - that part which reads "$C_8H_{17}$
$\overline{\phantom{x}}$
$CHCH_2-$"

should read -- $\underset{|}{C_8H_{17}}$ $CHCH_2-$ --;

Col. 14, line 64 - "-3,3,-4,4-" should read -- -3,3,4,4- --;

Col. 15, line 8 - "](" should read -- [( --;

Col. 15, line 41 - "51,8; H, 105;" should read
-- 51.8; H, 1.05; --;

Col. 15, line 50 - "(1,-1,2,2-" should read -- (1,1,2,2- --;

Col. 15, line 60 - "structure" should read -- structural --;

UNITED STATES PATENT OFFICE
CERTIFICATE OF CORRECTION

Patent No. U.S.P. 3,758,543   Dated September 11, 1973

Inventor(s) LOUIS G. ANELLO and RICHARD F. SWEENEY

It is certified that error appears in the above-identified patent and that said Letters Patent are hereby corrected as shown below:

Col. 16, line 27 - "1-iodo--" should read -- 1-iodo-1,1,2,2- --;

Col. 17, line 6 - "C, 21,70;" should read -- C, 21.70; --;

Col. 17, line 18 - "form" should read -- formed --;

Col. 18, line 17 - "H, 09087;" should read -- H, 0.078; --

Col. 20, Table I, 7th formula - "[(F" should read -- ([F --;

Col. 21, Table I, 20th formula - "$(CF_3()C_4F_9)$" should read -- $(CF_3)(C_4F_9)$ --;

Col. 21, Table I, 24th formula - "$[(CF_2)_8]_2$" should read -- $[F(CF_2)_8]_2$ --;

Col. 21, Table I, 29th formula - that part which reads "$(CClCFF_2)_n$" should read -- $(CClFCF_2)_n$ --;

Col. 22, Table I, 9th formula - "$[C_4F_9)$" should read -- $[(C_4F_9)$ --;

Col. 22, Table I, 13th formula - "$[(CG_2Cl)$" should read -- $[(CF_2Cl)$ --;

Col. 22, Table I, 24th formula - "$[(F(CF_2)_8]_2$" should read -- $([F(CF_2)_8]_2$ --;

// Page 5

UNITED STATES PATENT OFFICE
CERTIFICATE OF CORRECTION

Patent No. U.S.P. 3,758,543     Dated September 11, 1973

Inventor(s) LOUIS G. ANELLO and RICHARD F. SWEENEY

It is certified that error appears in the above-identified patent and that said Letters Patent are hereby corrected as shown below:

Col. 24, line 42 - "wherein R, C, C, m, n and v" should

-- wherein R, C, D, m, n and v --.

Signed and sealed this 26th day of November 1974.

(SEAL)
Attest:

McCOY M. GIBSON JR.
Attesting Officer

C. MARSHALL DANN
Commissioner of Patents